United States Patent
Kim et al.

(10) Patent No.: US 10,306,429 B2
(45) Date of Patent: May 28, 2019

(54) METHOD FOR TRANSMITTING SIGNAL FOR V2X COMMUNICATION IN WIRELESS COMMUNICATION SYSTEM AND DEVICE FOR SAME

(71) Applicant: LG ELECTRONICS INC., Seoul (KR)

(72) Inventors: Youngtae Kim, Seoul (KR); Hanbyul Seo, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/758,321

(22) PCT Filed: Sep. 12, 2016

(86) PCT No.: PCT/KR2016/010268
§ 371 (c)(1),
(2) Date: Mar. 7, 2018

(87) PCT Pub. No.: WO2017/043947
PCT Pub. Date: Mar. 16, 2017

(65) Prior Publication Data
US 2018/0249307 A1    Aug. 30, 2018

Related U.S. Application Data

(60) Provisional application No. 62/271,036, filed on Sep. 11, 2015.

(51) Int. Cl.
*H04W 72/04* (2009.01)
*H04W 4/44* (2018.01)
(Continued)

(52) U.S. Cl.
CPC ............... *H04W 4/44* (2018.02); *H04L 5/00* (2013.01); *H04W 72/04* (2013.01); *H04B 1/713* (2013.01); *H04B 2001/6908* (2013.01)

(58) Field of Classification Search
CPC .......... H04W 4/44; H04W 72/04; H04L 5/00; H04B 2001/6908; H04B 1/713
See application file for complete search history.

(56) References Cited

U.S. PATENT DOCUMENTS

| | | | |
|---|---|---|---|
| 6,466,559 B1* | 10/2002 | Johansson | H04J 13/16 370/335 |
| 2016/0212793 A1* | 7/2016 | Jung | H04W 76/14 |
| 2017/0064704 A1* | 3/2017 | Seo | H04W 72/02 |

FOREIGN PATENT DOCUMENTS

| | | |
|---|---|---|
| WO | 2015050392 | 4/2015 |
| WO | 2015122684 | 8/2015 |

OTHER PUBLICATIONS

PCT International Application No. PCT/KR2016/010268, Written Opinion of the International Searching Authority dated Dec. 23, 2016, 19 pages.

(Continued)

*Primary Examiner* — Lakeram Jangbahadur
(74) *Attorney, Agent, or Firm* — Lee, Hong, Degerman, Kang & Waimey PC

(57) ABSTRACT

The present invention relates to a method and a device for transmitting a vehicle to everything (V2X) signal of user equipment for V2X communication in a wireless communication system. Particularly, the present invention comprises the steps of: receiving a resource pool configuration of which a first resource unit and a second resource unit, set for V2X communication, are defined; and transmitting the V2X signal, according to the resource pool configuration, through a specific resource region among the entire time-frequency hopped resource region, wherein the first resource unit is a (Continued)

multiple of the second resource unit, a first resource region corresponding to the first resource unit comprises a plurality of second resource regions corresponding to the second resource unit, and with respect to time-frequency hopping, frequency axis-based hopping or time axis-based hopping is determined according to a period of the V2X signal.

10 Claims, 10 Drawing Sheets

(51) Int. Cl.
*H04L 5/00* (2006.01)
*H04B 1/713* (2011.01)
*H04B 1/69* (2011.01)

(56) References Cited

OTHER PUBLICATIONS

Catt, "Resource pool configuration for D2D communication", 3GPP TSG RAN WG1 Meeting #78bis, R1-143741, Oct. 2014, 3 pages.
Catt, "Resource pool allocation for D2D communication", 3GPP TSG RAN WG1 Meeting #77, R1-142005, May 2014, 2 pages.

* cited by examiner (a) control plane protocol stack (b) user plane protocol stack (a)

(b)

(a)

(b)

(c)

METHOD FOR TRANSMITTING SIGNAL FOR V2X COMMUNICATION IN WIRELESS COMMUNICATION SYSTEM AND DEVICE FOR SAME

CROSS-REFERENCE TO RELATED APPLICATIONS

This application is the National Stage filing under 35 U.S.C. 371 of International Application No. PCT/KR2016/010268, filed on Sep. 12, 2016, which claims the benefit of U.S. Provisional Application No. 62/217,036, filed on Sep. 11, 2015, the contents of which are all hereby incorporated by reference herein in their entirety.

TECHNICAL FIELD

The present invention relates to a wireless communication system, and more particularly, to a method of transmitting a signal for V2X communication in a wireless communication system and an apparatus therefor.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE OF THE INVENTION

Technical Task

Based on the aforementioned discussion, a method of transmitting a signal for V2X communication in a wireless communication system and an apparatus therefor are proposed in the following.

The technical problems solved by the present invention are not limited to the above technical problems and those skilled in the art may understand other technical problems from the following description.

Technical Solutions

To achieve these objects and other advantages, in an aspect of the present invention, provided herein is a method for transmitting a vehicle to everything (V2X) signal for V2X communication by a user equipment (UE) in a wireless communication system, including: receiving a resource pool configuration in which a first resource unit and a second resource unit, which are set for the V2X communication, are defined; and transmitting the V2X signal through a specific resource region of an entire resource region to which time-frequency hopping is applied according to the resource pool configuration, wherein the first resource unit is a multiple of the second resource unit, wherein a first resource region corresponding to the first resource unit is composed of a plurality of second resource regions each of which corresponding to the second resource unit, wherein the specific resource region is one of the first and second resource regions, and wherein whether the time-frequency hopping is frequency-domain hopping or time-domain hopping is determined according to a period of the V2X signal.

Additionally, when the time-frequency hopping is determined as the frequency-domain hopping, numbering on each of the first and second resource units may be performed with respect to a frequency axis, and then the hopping may be applied to the entire resource region.

Additionally, when the time-frequency hopping is determined as the time-domain hopping, numbering on each of the first and second resource units may be performed with respect to a time axis, and then the hopping may be applied to the entire resource region.

Additionally, in the second resource region, the time-frequency hopping may be applied with respect to the first resource region to which the time-frequency hopping is applied.

Additionally, in the second resource region, the time-frequency hopping may be applied with respect to the first resource region to which the time-frequency hopping is applied.

In another aspect of the present invention, provided herein is a user equipment (UE) for transmitting a vehicle-to-everything (V2X) signal for V2X communication in a wireless communication system, including: a radio frequency unit; and a processor, wherein the processor is configured to receive a resource pool configuration in which a first resource unit and a second resource unit, which are set for the V2X communication, are defined and transmit the V2X signal through a specific resource region of an entire resource region to which time-frequency hopping is applied according to the resource pool configuration, wherein the first resource unit is a multiple of the second resource unit, wherein a first resource region corresponding to the first resource unit is composed of a plurality of second resource regions each of which corresponding to the second resource unit, wherein the specific resource region is one of the first and second resource regions, and wherein whether the time-frequency hopping is frequency-domain hopping or time-domain hopping is determined according to a period of the V2X signal.

Advantageous Effects

According to the present invention, it is able to efficiently transmit a signal for V2X communication in a wireless communication system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention.

BEST MODE FOR INVENTION

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

Figure 1:
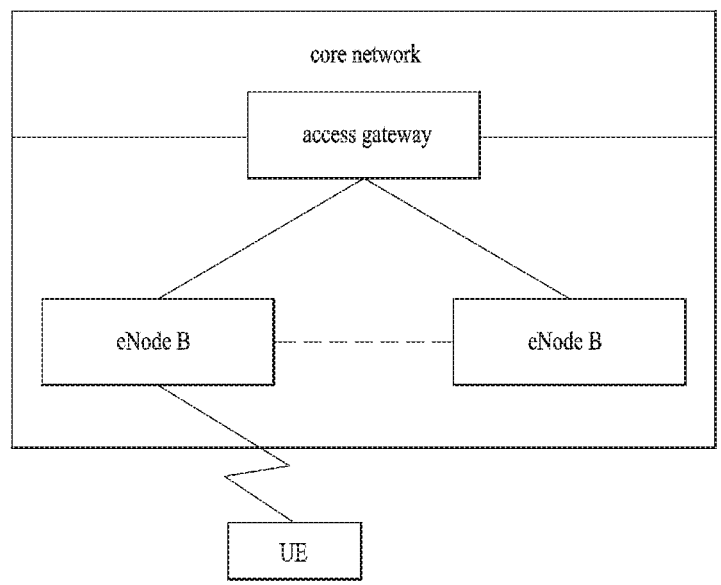
FIG. 1 is a schematic diagram of E-UMTS network structure as one example of a wireless communication system.
Figure 2:
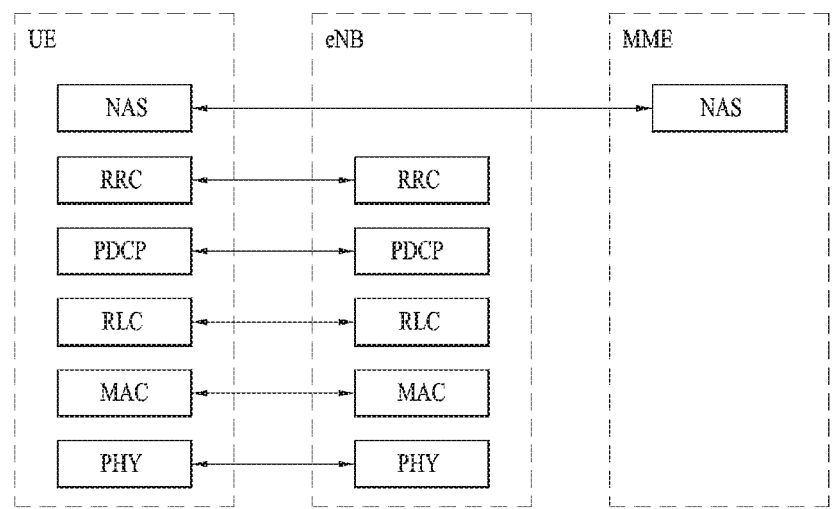
FIG. 2 is a diagram illustrating structures of a control plane and a user plane of a radio interface protocol between a user equipment and E-UTRAN based on the 3GPP radio access network standard.
Figure 2:
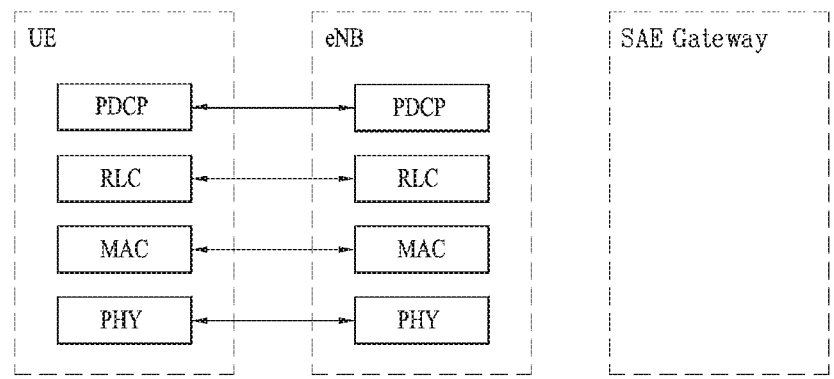

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
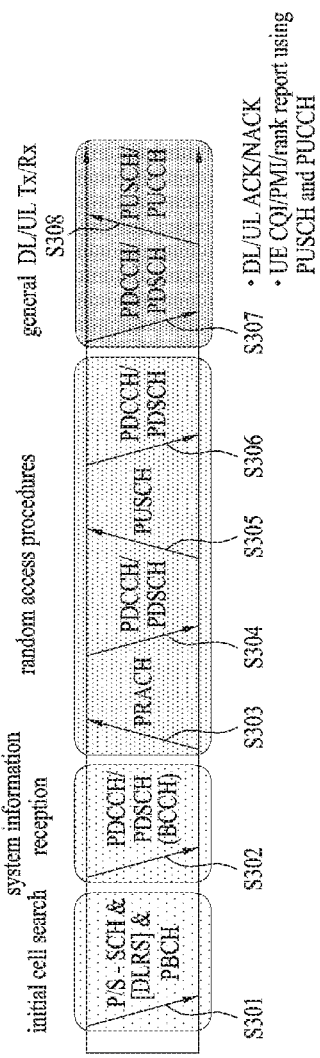
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
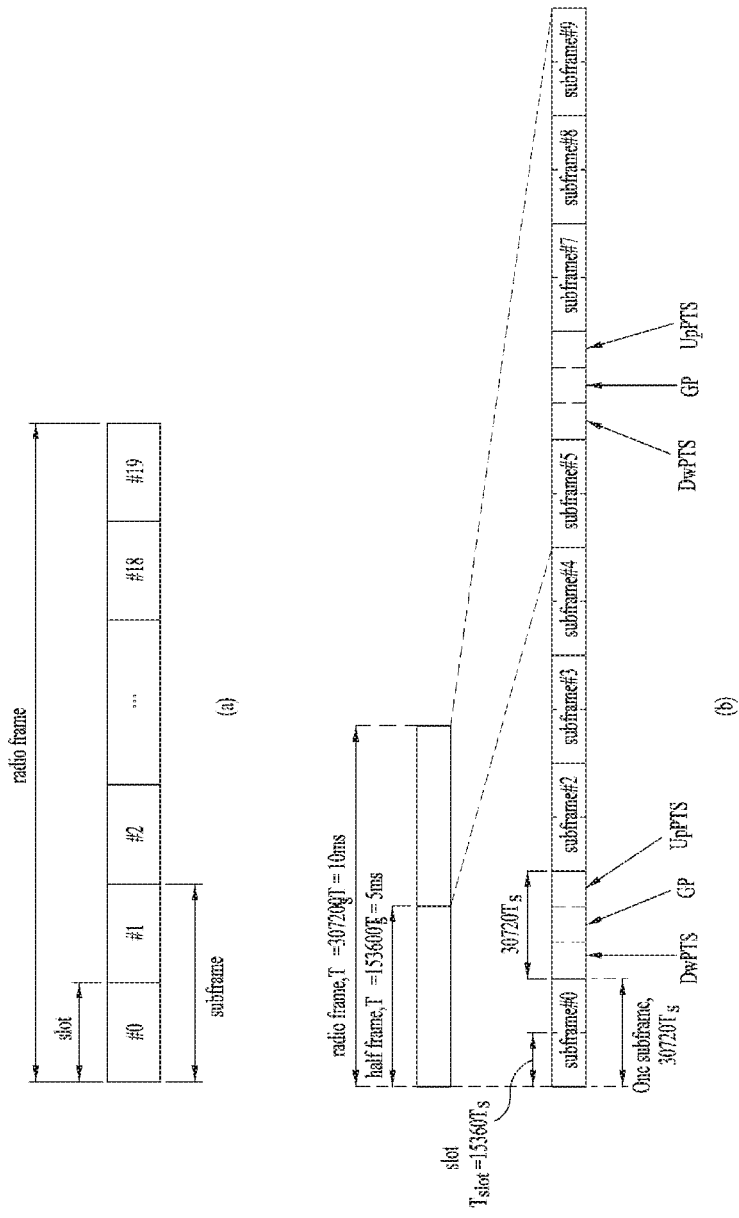
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of, and the other region is configured for the guard period.

The structure of the aforementioned radio frame is only exemplary, and various modifications may be made in the number of subframes included in the radio frame, the number of slots included in the subframe, or the number of symbols included in the slot.

Figure 5:
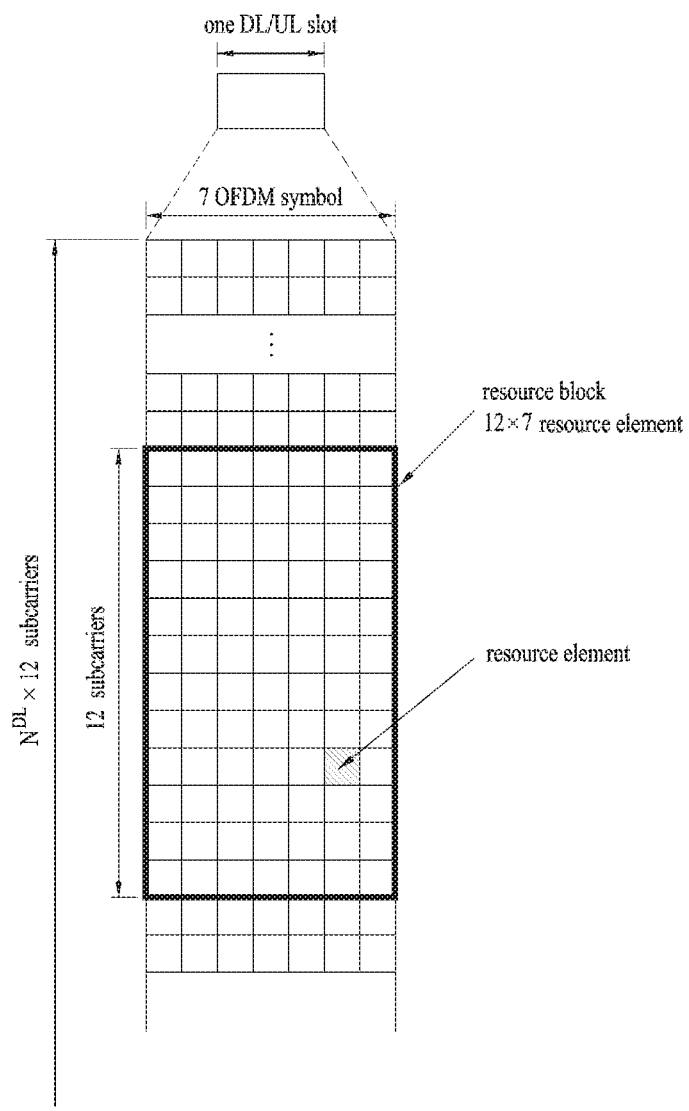
FIG. 5 is a diagram of a resource grid for a downlink slot.

FIG. 5 is a diagram for an example of a resource grid for a downlink slot.

Referring to FIG. 5, a downlink slot includes $N_{symb}^{DL}$ OFDM symbols in time domain and resource blocks in frequency domain. Since each resource block includes $N_{RB}^{DL}$ subcarriers, a downlink slot includes $N_{RB}^{DL} \times N_{sc}^{RB}$ subcarriers in frequency domain. FIG. 5 shows an example that a downlink slot includes 7 OFDM symbols and a resource block includes 12 subcarriers, by which the present invention may be non-limited. For example, the number of OFDM symbols included in a downlink slot may vary according to a length of a cyclic prefix (CP)

Each element on a resource grid is called a resource element (hereinafter abbreviated RE) and one resource element is indicated by a single OFDM symbol index and a single subcarrier index. One RB consists of $N_{symb}^{DL} \times N_{sc}^{RB}$ resource elements. The number ($N_{RB}^{DL}$) of resource blocks included in a downlink slot is dependent on a downlink transmission bandwidth configured in a cell.

TABLE 1

| | | Normal cyclic prefix in downlink | | | Extended cyclic prefix in downlink | |
|---|---|---|---|---|---|---|
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

Figure 6:
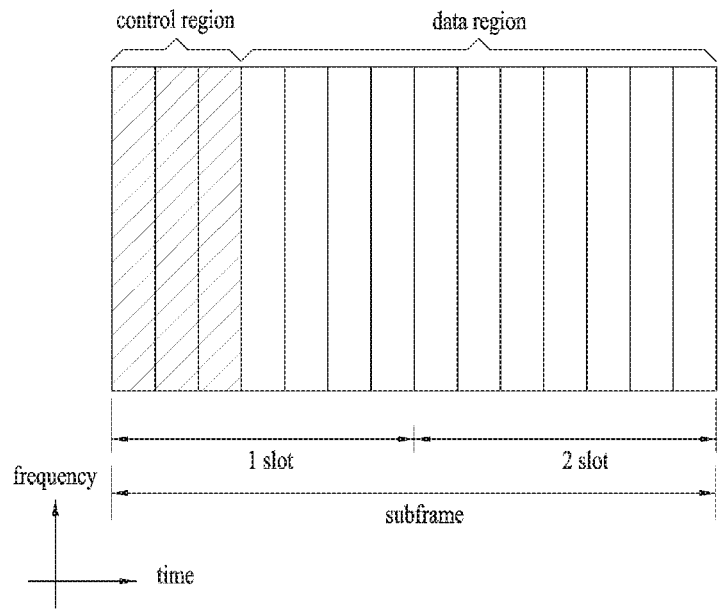
FIG. 6 is a diagram for an example of a structure of a downlink subframe.

FIG. 6 is a diagram for an example of a structure of a downlink subframe.

Referring to FIG. 6, maximum 3 (4) OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by LTE may include PCFICH (Physical Control Format Indicator Channel), PDCCH (Physical Downlink Control Channel), PHICH (Physical hybrid ARQ indicator Channel) and the like. The PCFICH carried on a first OFDM symbol of a subframe carries the information on the number of OFDM symbols used for the transmission of control channels within the subframe. The PHICH carries HARQ ACK/NACK (hybrid automatic repeat request acknowledgement/negative acknowledgement) signal in response to an UL transmission.

Control information carried on PDCCH may be called downlink control information (DCI). The DCI includes resource allocation information for a user equipment or a user equipment group and different control information. For example, the DCI includes DL/UL scheduling information, UL transmit (Tx) power control command and the like.

PDCCH is able to carry a transmission format and resource allocation information of DL-SCH (downlink shared channel), a transmission format and resource allocation information of UL-SCH (uplink shared channel), paging information on PCH (paging channel), system information on DL-SCH, resource allocation information of an upper layer control message such as a random access response transmitted on PDSCH, a transmit power control command set for individual user equipments within a user equipment (UE) group, a transmit power control command, activation indication information of VoIP (voice over IP) and the like. A plurality of PDCCHs can be transmitted in a control region and a user equipment is able to monitor a plurality of the PDCCHs. PDCCH is transmitted on an aggregation of a plurality of contiguous control channel elements (CCEs). A CCE is a logical assignment unit used to provide PDCCH with a code rate in accordance with a state of a radio channel. A CCE corresponds to a plurality of REGs (resource element groups). A format of PDCCH and the number of bits of PDCCH are determined by the number of the CCEs. A base station determines a PDCCH format in accordance with DCI to be transmitted to a user equipment and attaches CRC (cyclic redundancy check) to control information. The CRC is masked with an identifier (e.g., RNTI (radio network temporary identifier)) in accordance with an owner or usage of PDCCH. If the PDCCH is provided for a specific user equipment, the CRC can be masked with an identifier of the corresponding user equipment, i.e., C-RNTI (i.e., Cell-RNTI). As a different example, if the PDCCH is provided for a paging message, the CRC can be masked with a paging identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). If the PDCCH is provided for a random access response, the CRC can be masked with RA-RNTI (random access-RNTI).

Figure 7:
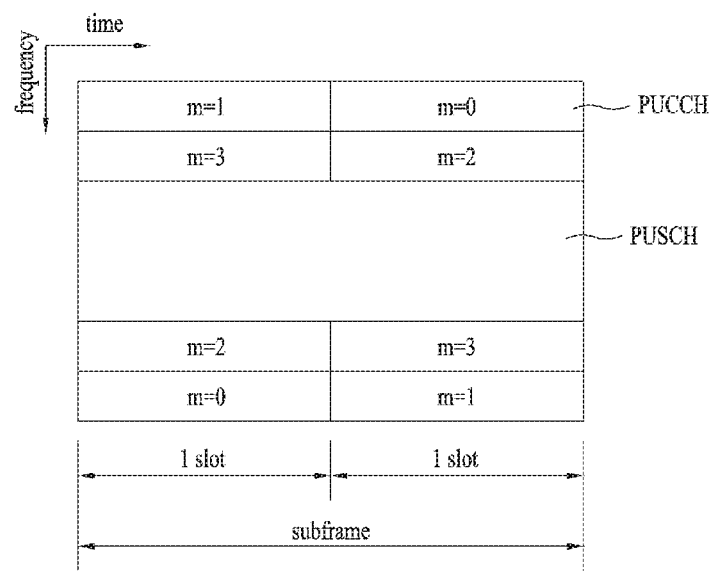
FIG. 7 is a diagram for an example of a structure of an uplink subframe in LTE.

FIG. 7 is a diagram for an example of a structure of an uplink subframe in LTE.

Referring to FIG. 7, an uplink subframe includes a plurality of slots (e.g., 2 slots). A slot can include the different number of SC-FDMA symbols depending on a CP length. An uplink subframe is divided into a data region and a control region in frequency domain. The data region includes PUSCH and is used for transmitting a data signal such as audio and the like. The control region includes PUCCH and is used for transmitting uplink control information (UCI). PUCCH includes an RP pair positioned at both ends of the data region in frequency axis and hops at a slot boundary.

PUCCH can be used for transmitting control information described in the following.
SR (scheduling request): Information used for requesting uplink UL-SCH resource. OOK (on-off keying) scheme is used to transmit the SR.
HARQ ACK/NACK: Response signal for a DL data packet on PDSCH. This information indicates whether or not a DL data packet is successfully received. ACK/NACK 1 bit is transmitted in response to a single DL codeword. ACK/NACK 2 bits are transmitted in response to two DL codewords.
CSI (channel state information): Feedback information on a DL channel. CSI includes a CQI (channel quality indicator) and MIMO (multiple input multiple output)-related feedback information includes an RI (rank indicator), a PMI (precoding matrix indicator), a PTI (precoding type indicator) and the like. 20 bits per subframe are used.

An amount of control information (UCI) capable of being transmitted by a user equipment in a subframe is dependent on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which an SRS (sounding reference signal) is set, a last SC-FDMA symbol of a subframe is also excluded. A reference signal is used for coherent detection of PUCCH.

In the following description, a D2D (UE-to-UE communication) communication is explained.

A D2D communication scheme is mainly divided into a scheme of receiving help from a network/coordination station (e.g., a base station) and a scheme not receiving help from the network/coordination station.

Figure 8:
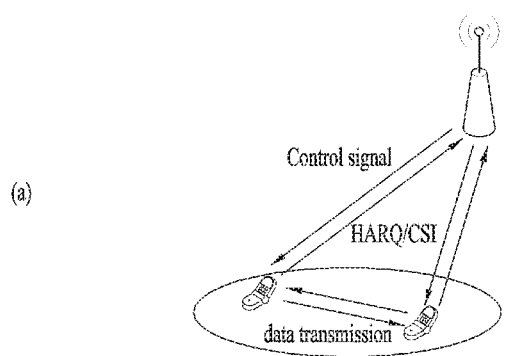
FIG. 8 is a diagram for explaining D2D (UE-to-UE communication) communication.
Figure 8:
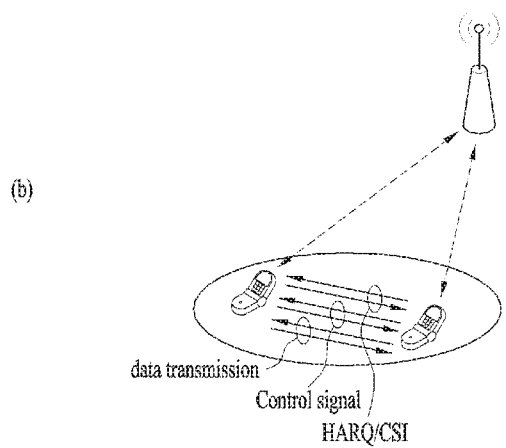

Referring to FIG. 8, FIG. 8(a) shows a scheme that the network/coordination station involves in transmitting and receiving a control signal (e.g., a grant message), HARQ, channel state information, and the like and data is transmitted and received only between UEs performing D2D communication. FIG. 8(b) shows a scheme that the network provides minimum information (e.g., D2D connection information capable of being used in a corresponding cell, etc.) to UEs and the UEs performing D2D communication form a link and perform data transmission and reception.

Figures 9, 10:
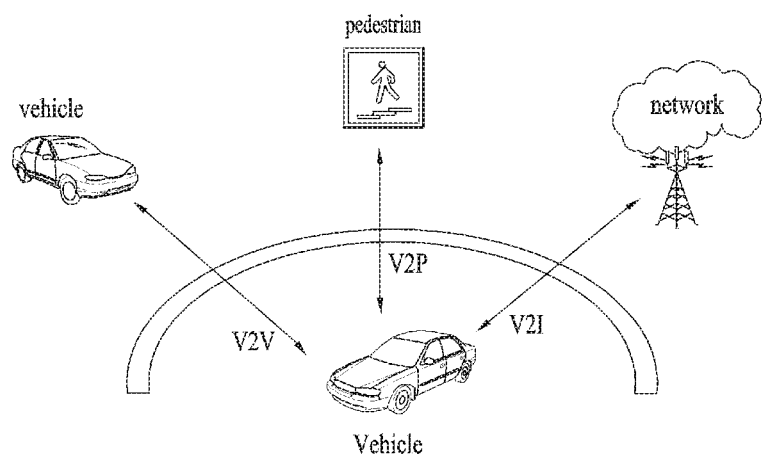
FIG. 9 is a diagram for explaining a V2X scenario.
FIG. 10 is a reference diagram for explaining time-frequency hopping.

FIG. 9 is a diagram illustrating V2X (vehicle to everything) communication environment.

If a car accident occurs, damage of human life and damage of property occur. Hence, when a vehicle operates, a technology capable of securing not only the safety of a person on the vehicle but also the safety of a pedestrian is increasingly required. As a result, a hardware and software based technology specialized to a vehicle is now incorporated into a vehicle.

An LTE-based V2X (vehicle-to-everything) communication technology started from 3GPP also reflects the tendency that an IT (information technology) is incorporated into a vehicle. A connectivity function is mainly applied to a certain type of vehicle and ongoing effort to support V2V (vehicle-to-vehicle) communication, V2I (vehicle-to-infrastructure) communication, V2P (vehicle-to-pedestrian) communication, and V2N (vehicle-to-network) is in progress via the evolvement of the connectivity function.

According to the V2X communication, a vehicle consistently broadcasts information on a location, a speed, a direction, and the like of the vehicle. Having received the broadcasted information, an adjacent vehicle recognizes movement of vehicles near the adjacent vehicle and utilizes the movements to prevent an accident.

Similar to a case that a person possesses a terminal having a shape of a smartphone or a smart watch, a terminal (or, a UE (user equipment)) of a specific shape is installed in each vehicle. In this case, the UE installed in a vehicle corresponds to a device receiving an actual communication service from a network. For example, the UE installed in the vehicle can receive a communication service in a manner of accessing an eNB in E-UTRAN.

Yet, in order to implement V2X communication in a vehicle, it is necessary to consider various items. This is because an astronomical amount of money is required to install a traffic safety infrastructure such as a V2X eNB, and the like. In particular, in order to support the V2X communication to all of the roads on which a vehicle is movable, it is necessary to install hundreds of thousands of V2X eNBs. Moreover, since each network node basically uses a wired network to stably perform communication with a server and accesses the internet or a central control server using the wired network, installation/maintenance cost for the wired network is also high.

Based on the above discussion, time-frequency hopping in a V2X environment will be explained. Although for convenience of description, the present invention is described with respect to V2X communication, the invention can be applied to other scenarios including D2D communication.

In the LTE system, frequency hopping on a D2D-related channel (e.g., sidelink channel) has been defined to be performed based on a fixed number of resource blocks (RBs). However, in a V2X scenario, the number of assigned RBs may be variable rather than fixed to a specific value. In this case, it may be difficult to apply the D2D-related frequency hopping of the LTE system to the V2X scenario.

In the case of sidelink discovery type 2B, time-frequency hopping has been defined for the current LTE D2D discovery channel (i.e., physical sidelink discovery channel (PSDCH)). By doing so, when a discovery signal is transmitted every discovery period, if transmission is simultaneously performed, it is possible to prevent the discovery signal from being continuously located at the same time-domain position as a signal transmitted from another UE at the same time.

In the case of sidelink discovery type 2B, the hopping is defined as shown in Table 3 for the D2D discovery channel (i.e., physical sidelink discovery channel, (PSDCH)) of the LTE system.

in the time domain, and $(m_0^{PSDCH}, m_1^{PSDCH}, \ldots, m_{M_{RB}^{PSDCH\_RP}-1}^{PSDCH})$ indicates RBs in the frequency domain. In addition, i indicates transmission performed at an $i^{th}$ period. A frequency-domain position is defined by $a_j^{(i)}$, and a time-domain position is defined by $b_j^{(i)}$. Regarding $a_j^{(i)}$ and $b_j^{(i)}$, hopping is defined on the time-frequency grid, and transmission locations are formed such that the frequency and time axes are inverted according to changes in the PSDCH period, which depends on the value of i.

Referring to FIG. 10, $N_t$ and $N_f$ are 5 and 3, respectively. In addition, it can be seen that when a period is changed on each resource grid, transmission is performed such that the time and frequency axes are inverted. In FIG. 10, one resource on the resource grid has the number $N_{SLD}^{TX}$ of times of retransmission in the time domain and is composed of two RBs in the frequency domain. In the real transmission, transmission locations may be shifted by higher layer signaling, $N_{PSDCH}^{(1)}$, $N_{PSDCH}^{(2)}$, or $N_{PSDCH}^{(3)}$.

Thus, the present invention proposes a hopping method for V2X, and more particularly, a hierarchical hopping method in consideration of time-frequency hopping.

To be brief, when time-frequency is applied to a resource unit with size A, if the resource unit with size A is divided into resource units with size B (where B is smaller than A), the time-frequency hopping is applied to the resource units with size B within the resource unit with size A. In addition, if a resource unit with size B is divided into resource units with size C (where C is smaller than B), the time-frequency hopping is applied again within the resource unit with size B. It may be designed that the above processes are repeated until a resource unit has a desired size. If the time-frequency

TABLE 3 for sidelink discovery type 2B,
The j-th transmission $(1 \leq j \leq N_{SLD}^{TX})$ for the transport block occurs in contiguous resource blocks $m_{2a_j^{(1)}}^{PSDCH}$ and $m_{2a_j^{(1)}+1}^{PSDCH}$ of subframe $l_{N_{SLD}^{TX} 2a_j^{(1)}+j-1}^{PSDCH}$ of the PSDCH period, where $a_1^{(i)} = ((N_{PSDCH}^{(2)} + n')\bmod 10 + \lfloor(a_1^{(i-1)} + N_f \cdot b_1^{(j-1)}/N_1)\rfloor)\bmod N_f$
$b_1^{(i)} = (N_{PSDCH}^{(1)} + N_{PSDCH}^{(3)} \cdot a_1^{(i-1)} + N_f \cdot b_1^{(i-1)})\bmod N_1$ $a_j^{(i)} = ((j-1) \cdot \lfloor N_f / N_{SLD}^{TX} \rfloor + a_1^{(i)})\bmod N_f$ for $1 < j \leq N_{SLD}^{TX}$ $N_1 = \lfloor L_{PSDCH}/N_{SLD}^{TX} \rfloor$ and $N_f = \lfloor M_{RB}^{PSDCH,RF}/2 \rfloor$, and $(I_0^{PSDCH}, I_1^{PSDCH}, \ldots, I_{b_{num}+1}^{PSDCH}), \left(m_0^{PSDCH} \cdot m_1^{PSDCH}, \ldots, m_{M_{RB}^{PSDCH\_RP}-1}^{PSDCH}\right)$, $L_{PSDCH}$ and $M_{RB}^{PSDCH\_RB}$ are described in subclause 14.3.3.
$a_1^{(0)}$ and $b_1^{(0)}$ are given by higher layer parameters discPRB-Index-r12 and discSF-index-r12, respectively and that associated with the PSDCH resource configuration.
$N_{PSDCH}^{(1)}$, $N_{PSDCH}^{(2)}$ and $N_{PSDCH}^{(3)}$ are given by higher layer parameters a-r12, b-r12, and c-r12, respectively and that are associated with the PSDCH resource configuration.
$n^1$ is the number of PSDCH periods since $N_{PSDCH}^{(2)}$ was received.

According to Table 3, a discovery signals is configured to be transmitted in two adjacent PRB pairs $(m_{2 \cdot a_j^{(i)}}^{PSDCH}, m_{2 \cdot a_j^{(i)}+1}^{PSDCH})$.

For each discovery signal, the same transmission is performed $N_{SLD}^{TX}$ times. In this case, $N_{SLD}^{TX}=n+1$, where n indicates a retransmission number configured by a higher layer signaling parameter (discoveryNumRetx). In the repeated discovery signal transmission, $j_{th}$ transmission $(1 < j \leq N_{SLD}^{TX})$ is performed in RBs $m_{2 \cdot a_j^{(i)}}^{PSDCH}$ and $m_{2 \cdot a_j^{(i)}+1}^{PSDCH}$ of subframe $1_{N_{SLD}^{TX} \cdot b_j^{(i)}+j-1}^{PSDCH}$. In this case, $1_0^{PSDCH}, 1_1^{PSDCH}, \ldots, 1_{L_{PSDCH}-1}^{PSDCH})$ indicates subframes hopping is repeatedly applied to decreased resource units as described above, the frequency hopping can be easily applied to various RB sizes.

For example, since if anyone is selected from among the resource unit with size A, resource unit with size B, and resource unit with size C, the time-frequency hopping is applied, signals are located on different time resources every repeated period, thereby not only solving the half-duplex problem but also obtaining channel diversity due to changed frequency resources.

For convenience of description, an $S_i$ resource unit is defined as follows. That is, the $S_i$ resource unit has the number $T_i$ of subframes in the time domain and has the number $F_i$ of RBs in the frequency domain. In addition, the number $N_1$ of $S_1$ resource units are present in a given resource region, and the number $N_{i+1}$ of $S_{i+1}$ resource units are present in the $S_i$ resource unit. The resource amount of the $N_{i+1}$ of $S_{i+1}$ resource units is equal to that of the $S_i$ resource unit.

Figure 11:
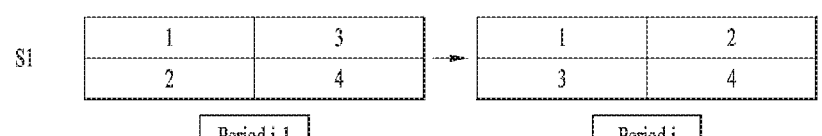
FIG. 11 is a reference diagram illustrating a case in which a plurality of resource units with different sizes is configured according to the present invention.

FIG. 11 is a reference diagram for explaining hierarchical resource units proposed in the present invention. For example, it is assumed in FIG. 11 that $S_1$, $S_2$, and $S_3$ resource units are defined. In addition, there are four $S_1$ resource units, eight $S_2$ resource units are present in each $S_1$ resource unit, and eight $S_3$ resource units are present in each $S_2$ resource unit. Referring to FIG. 11, it can be seen that eight $S_3$ resource units have the same amount of resources as a single $S_2$ resource unit and eight $S_2$ resource units the same amount of resources as a single $S_1$ resource unit.

As a transmission region transmitted by a UE, one or a multiple number of $S_i$ resource units may be selected. The selected transmission region may include a retransmission region. For example, when two PRB pairs are retransmitted four times, a resource region corresponding to eight PRB pairs may be selected.

If a time-frequency hopping rule performed every period for the $S_i$ resource unit is defined as $A_i$, $A_i$ is performed for each $S_i$ resource unit in ascending order of i. In this case, according to i, the same rule may be applied to $A_i$.

Figure 12:
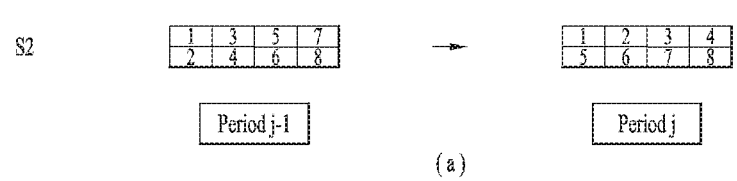
FIG. 12 is a reference diagram for explaining an embodiment of the present invention.
Figure 12:
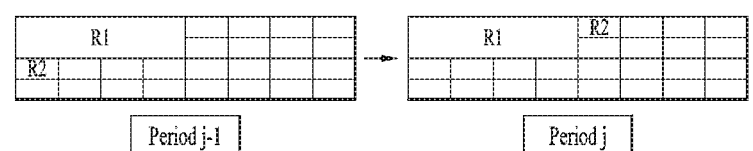
Figure 12:
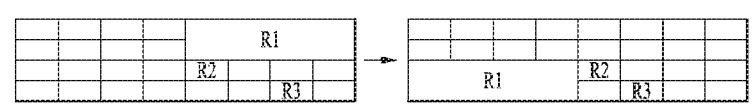

For example, referring to FIG. 12, four $S_1$ resource units are present, and eight $S_2$ resource units are present in each $S_1$ resource. In this case, time-frequency hopping is performed such that hopping is performed from i) resource units in the frequency domain or ii) resource units in the time domain in sequential numbered order. Further, the time-frequency hopping may be differently applied according to a V2X signal period.

FIG. 12 is a reference diagram for explaining an embodiment of the present invention. In FIG. 12, the same hopping rule is applied to $S_1$ and $S_2$ resource units. In addition, it is assumed that hopping is first applied to the $S_1$ resource unit and then applied to the $S_2$ resource unit based on the first hopping. FIG. 12(a) shows an embodiment related to the hopping rule, and FIG. 12(b) shows a case where two UEs intend to transmit signal R1 and signal R2, respectively. It can be seen that in period j−1, signals R1 and R2 partially overlap with each other in the time domain. However, it can also be checked that in the next period, the time-frequency hopping is applied, and thus the half-duplex problem between signals R1 and R2 is solved. FIG. 12(c) shows a case where three UEs intend to transmit signals R1, R2, and R3, respectively. It can be seen that in period j−1, signals R1, R2, and R3 partially overlap with each other in the time domain. However, it can also be checked that in the next period, the time-frequency hopping is applied, and thus the half-duplex problem between signals R1 and R2 is solved. That is, in period j−1, after numbering is performed with respect to the time domain, the hopping is applied to the entire resource region. On the contrary, in period j, after number is performed with respect to the frequency domain, the hopping is applied to the entire resource region.

In addition, different hopping rules may be applied according to resource unit sizes (for example, resource units are numbered with respect to the frequency domain and then hopping is applied, or resource units are number with respect to the time domain and then hopping is applied). Moreover, the maximum or minimum resource unit size may be determined in advance or configured by higher layer signaling.

When retransmission is included in the selected transmission region, similar channels may be used for retransmission. To prevent this problem, it is possible to perform frequency hopping one more time with respect to the entire resource region (e.g., resource pool) in the frequency domain after applying the time-frequency hopping every period.

Figure 13:
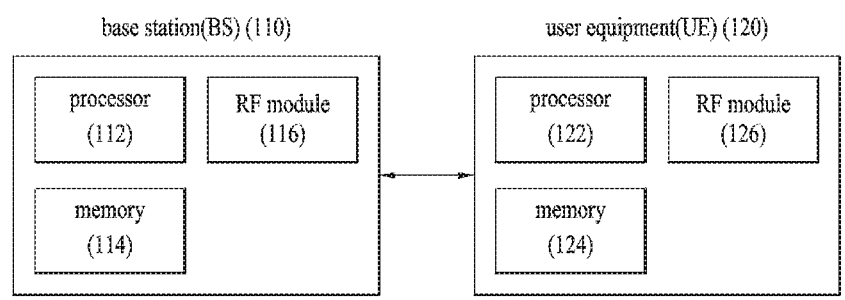
FIG. 13 is a diagram for examples of a base station and a user equipment capable of being applied to an embodiment of the present invention.

FIG. 13 is a diagram for a base station and a user equipment applicable to one embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 13, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

A method of transmitting a signal for V2X communication in a wireless communication system and an apparatus therefor can be applied to various wireless communication systems.

What is claimed is:

1. A method for transmitting a vehicle to everything (V2X) signal for V2X communication by a user equipment (UE) in a wireless communication system, the method comprising:
receiving a resource pool configuration in which a first resource unit and a second resource unit, which are set for the V2X communication, are defined; and
transmitting the V2X signal through a specific resource region of an entire resource region to which time-frequency hopping is applied according to the resource pool configuration,
wherein the first resource unit is a multiple of the second resource unit, wherein when time-frequency is applied to a resource unit with size A, when the resource unit with size A is divided into resource units with size B (where B is smaller than A), the time-frequency hopping is applied to the resource units with size B within the resource unit with size A, and when a resource unit with size B is divided into resource units with size C (where C is smaller than B), the time-frequency hopping is applied again within the resource unit with size B;
wherein a first resource region corresponding to the first resource unit is composed of a plurality of second resource regions each of which corresponding to the second resource unit, wherein a $S_i$ resource unit has the number $T_i$ of subframes in the time domain and has a number $F_i$ of resource blocks (RBs) in the frequency domain;
wherein the specific resource region is one of the first and second resource regions, and
wherein whether the time-frequency hopping is frequency-domain hopping or time-domain hopping is determined according to a period of the V2X signal.

2. The method of claim 1, wherein when the time-frequency hopping is determined as the frequency-domain hopping, numbering on each of the first and second resource units is performed with respect to a frequency axis, and then the hopping is applied to the entire resource region.

3. The method of claim 1, wherein when the time-frequency hopping is determined as the time-domain hopping, numbering on each of the first and second resource units is performed with respect to a time axis, and then the hopping is applied to the entire resource region.

4. The method of claim 1, wherein in the second resource region, the time-frequency hopping is applied with respect to the first resource region to which the time-frequency hopping is applied.

5. The method of claim 1, wherein in the second resource region, the time-frequency hopping is applied with respect to the first resource region to which the time-frequency hopping is applied.

6. A user equipment (UE) for transmitting a vehicle-to-everything (V2X) signal for V2X communication in a wireless communication system, the UE comprising:
a radio frequency unit; and
a processor,
wherein the processor is configured to receive a resource pool configuration in which a first resource unit and a second resource unit, which are set for the V2X communication, are defined and transmit the V2X signal through a specific resource region of an entire resource region to which time-frequency hopping is applied according to the resource pool configuration,
wherein the first resource unit is a multiple of the second resource unit, wherein when time-frequency is applied to a resource unit with size A, when the resource unit with size A is divided into resource units with size B (where B is smaller than A), the time-frequency hopping is applied to the resource units with size B within the resource unit with size A, and when a resource unit with size B is divided into resource units with size C (where C is smaller than B), the time-frequency hopping is applied again within the resource unit with size B;
wherein a first resource region corresponding to the first resource unit is composed of a plurality of second resource regions each of which corresponding to the second resource unit, wherein a $S_i$ resource unit has the number $T_i$ of subframes in the time domain and has a number $F_i$ of resource blocks (RBs) in the frequency domain;
wherein the specific resource region is one of the first and second resource regions, and
wherein whether the time-frequency hopping is frequency-domain hopping or time-domain hopping is determined according to a period of the V2X signal.

7. The UE of claim 6, wherein when the time-frequency hopping is determined as the frequency-domain hopping, numbering on each of the first and second resource units is performed with respect to a frequency axis, and then the hopping is applied to the entire resource region.

8. The UE of claim 6, wherein when the time-frequency hopping is determined as the time-domain hopping, numbering on each of the first and second resource units is performed with respect to a time axis, and then the hopping is applied to the entire resource region.

9. The UE of claim 6, wherein in the second resource region, the time-frequency hopping is applied with respect to the first resource region to which the time-frequency hopping is applied.

10. The UE of claim 6, wherein in the second resource region, the time-frequency hopping is applied with respect to the first resource region to which the time-frequency hopping is applied.

* * * * *